United States Patent
DiMeglio

(10) Patent No.: US 10,261,547 B1
(45) Date of Patent: Apr. 16, 2019

(54) SMART DEVICE CONCEALMENT PENDANT SYSTEM

(71) Applicant: Dawn DiMeglio, Atlanta, GA (US)

(72) Inventor: Dawn DiMeglio, Atlanta, GA (US)

(*) Notice: Subject to any disclaimer, the term of this patent is extended or adjusted under 35 U.S.C. 154(b) by 0 days.

(21) Appl. No.: 15/950,942

(22) Filed: Apr. 11, 2018

(51) Int. Cl.
*G06F 1/16* (2006.01)
*G06F 1/18* (2006.01)

(52) U.S. Cl.
CPC .......... *G06F 1/1656* (2013.01); *G06F 1/1628* (2013.01); *G06F 1/1632* (2013.01); *G06F 1/1675* (2013.01); *G06F 1/181* (2013.01)

(58) Field of Classification Search
CPC ....................................... G06F 1/163
USPC ................................... 361/679.03
See application file for complete search history.

(56) References Cited

U.S. PATENT DOCUMENTS

| | | |
|---|---|---|
| 1,512,880 A | 10/1924 | Cotler |
| 1,549,909 A | 8/1925 | Cotler |
| 1,606,403 A | 11/1926 | Dinhofer |
| 1,991,284 A | 2/1935 | Lewbel |
| 2,065,657 A | 12/1936 | Coleman |
| 2,557,273 A | 6/1951 | Gates |
| D293,287 S | 12/1987 | Cauque et al. |
| 5,206,841 A | 4/1993 | Boucheron |
| 5,657,298 A | 8/1997 | Choay |
| D386,426 S | 11/1997 | Gemmell |
| 6,529,372 B1 * | 3/2003 | Ng .......................... G06F 1/163 312/223.2 |
| D600,138 S | 9/2009 | Tang |
| 7,946,758 B2 * | 5/2011 | Mooring .............. G04B 37/005 368/276 |
| D761,151 S | 7/2016 | Weems et al. |
| 9,804,571 B2 | 10/2017 | Lee et al. |
| 2001/0024406 A1 | 9/2001 | Blotky et al. |
| 2005/0116003 A1 * | 6/2005 | Butler ..................... A45C 11/22 224/604 |
| 2007/0279852 A1 * | 12/2007 | Daniel ................. A44C 5/0007 361/679.03 |
| 2009/0133499 A1 * | 5/2009 | Cato ......................... G01P 5/08 73/514.16 |
| 2009/0156272 A1 * | 6/2009 | Ohuchi .................. H04B 1/385 455/575.1 |
| 2014/0337621 A1 * | 11/2014 | Nakhimov .............. G06F 1/163 713/168 |

(Continued)

FOREIGN PATENT DOCUMENTS

SU  473645 A1  2/1976

OTHER PUBLICATIONS

Sinn Spezialuhren, "SINN Spezialuhren—Das Duale Bandsystem // The Dual Strap System," YouTube, Aug. 9, 2016, https://www.youtube.com/watch?v=z64_-_tWmvo.

*Primary Examiner* — Anthony Q Edwards
(74) *Attorney, Agent, or Firm* — Troutman Sanders LLP; Alexis N. Simpson; Tiffany N. Palmer

(57) ABSTRACT

Disclosed herein are smart device concealment systems and methods for using the same. The smart device systems comprise a retention sheath configured to receive and retain a smart device, a concealment panel joined to the retention sheath and configured to at least partially conceal the smart device, and an attachment mechanism for securing the smart device onto the retention sheath. The concealment system may be attached to a chain and worn as a necklace.

21 Claims, 9 Drawing Sheets

(56) References Cited

U.S. PATENT DOCUMENTS

2015/0296963 A1\* 10/2015 Byun .................. A45F 5/02
                                                            224/191
2016/0274549 A1   9/2016 Rasmus \* cited by examiner

SMART DEVICE CONCEALMENT PENDANT SYSTEM

FIELD OF THE DISCLOSURE

This disclosure relates generally to smart device concealment systems and related methods. In particular, this disclosure relates to jewelry and accessory systems configured to conceal smart devices and related methods of using same.

BACKGROUND

Watches were once a mere tool for timekeeping. However, this wearable timepiece has undergone tremendous transformation over the years attributable to increased demand for added functionality and stylish design. Apple, Inc. recently revolutionized this symbol of personal style with its development of the APPLE WATCH®, a smart watch generally worn on the wrist. It enables users to answer calls, check text messages and emails, track fitness progress, and monitor health. Other smart device manufacturers have followed suit and launched similar products. These wearable devices' advanced technical features and stylish wristbands in assorted colors and high-end finishes are highly coveted and wildly popular amongst consumers. Third-party companies have latched on to this demand, developing and selling even trendier bands for use with these smart devices. However, all of the bands currently on the market focus on enhancing the look of these smart devices or displaying these smart devices as status symbols. Other, more practical systems for interacting with these devices should be explored.

SUMMARY

Some wearers of smart devices do not desire to wear smart watches publicly displayed at all times. To the contrary, some wearers want to take advantage of smart watches' many features while reserving wrist space for more traditional, nostalgic, and/or luxury timepieces. Indeed, some wearers desire a concealment mechanism configured to assist in making smart devices wearable but hidden. It is an object of the present invention to provide such a system.

Accordingly, disclosed herein are smart device concealment systems, comprising a retention sheath configured to receive and retain a smart device having a back side, user interface side, a top end, and a bottom end, a concealment panel joined to the retention sheath and configured to conceal at least a back side of the smart device, and an attachment mechanism for securing the smart device onto the retention sheath.

In some embodiments, the attachment mechanism includes a top hook configured to engage the top end of the smart device and double spring hooks configured to engage the bottom end of the smart device. In some embodiments, the attachment mechanism includes a top hook configured to engage the top end of the smart device and twist-and-lock hooks configured to engage the bottom end of the smart device.

In some embodiments, the concealment system further comprises a frame configured to surround the smart device and formed with a first loop and second loop, wherein the first loop is configured to join the frame with the retention sheath, and wherein the second loop is configured to join the smart device with an accessory attachment.

In some embodiments, the accessory attachment is a necklace. In some embodiments, the smart device concealment system further comprises a bracelet adapter for attaching a bracelet.

In some embodiments, the smart device concealment system further comprises a back casing for covering the user interface side of the smart device.

In some embodiments, the smart device concealment system, comprises a retention sheath configured to receive and retain a smart device having a back side, user interface side, a top end, and a bottom end, a concealment panel joined to the retention sheath and configured to conceal at least a back side of the smart device, and an attachment mechanism for securing the smart device onto the retention sheath, wherein the attachment mechanism includes a top hook configured to engage the top end of the smart device and double spring hooks configured to engage the bottom end of the smart device.

In some embodiments, the smart device concealment system further comprises a charger module for recharging a battery of the smart device. In some embodiments, the charging module is triggered by an actuating motion of the concealment system.

DESCRIPTION OF EXEMPLARY EMBODIMENTS

Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive. Therefore, specific structural and functional details disclosed herein are not to be interpreted as limiting, but merely as a representative basis for teaching one skilled in the art to variously employ the present invention.

Specifically disclosed herein are smart device concealment systems and methods of using the same. In some embodiments, disclosed are concealment systems and methods to permit consumers to inconspicuously wear and interact with smart devices. The ability to conceal smart devices would enable consumers to monitor potential emergencies, manage childcare, prevent attraction from targeting thieves, and conceal cameras and recording devices useful for recording daily personal and professional activities. Accordingly, this application discloses novel systems and methods that enable wearing smart devices discreetly.

Figure 1:
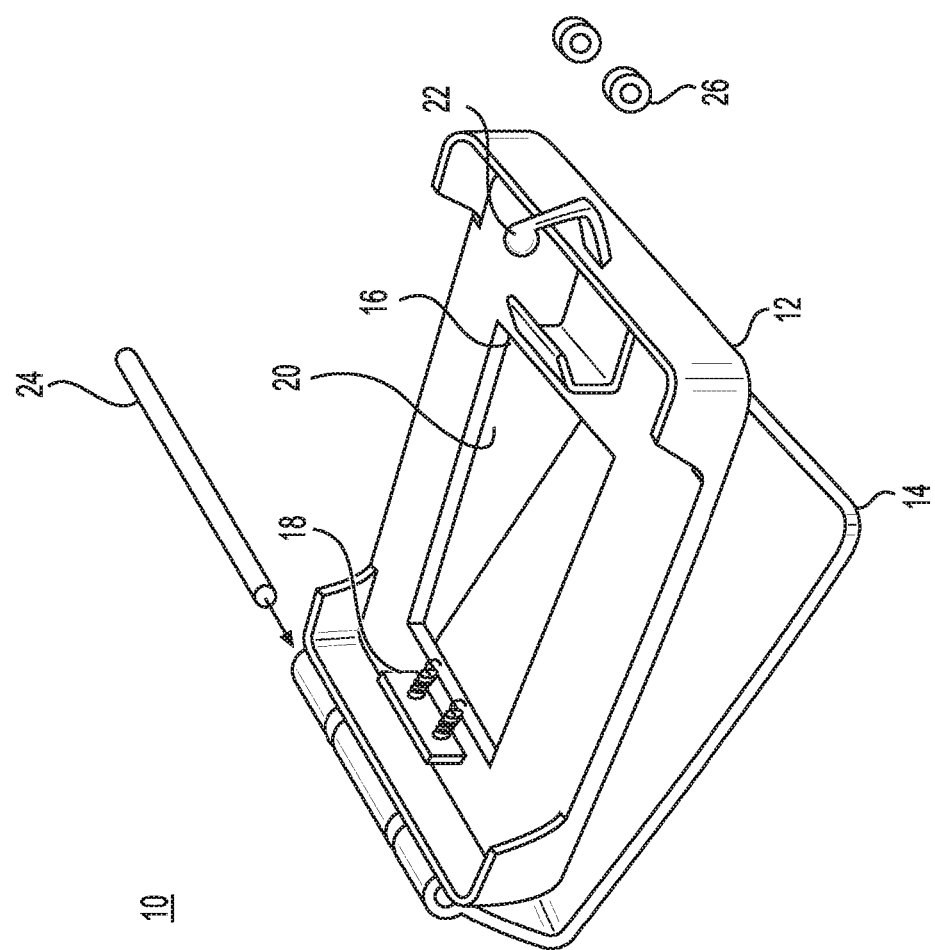
FIG. 1 depicts an embodiment of a concealment device system disclosed herein, not necessarily drawn to scale.

FIGS. 1-6 depict embodiments of a wearable smart device concealment system. FIG. 1 depicts smart device concealment system 10, comprising a retention sheath 12 and a concealment panel 14. In some embodiments, retention sheath 12 is configured to receive and retain a smart device 42 having a back side, user interface side, a top end, and a bottom end. In some embodiments, concealment panel 14 may be joined to retention sheath 12 and configured to conceal at least a back side of smart device 42. In some embodiments, concealment system 10 may include any suitable attachment mechanism now known or later developed for securing smart device 42 onto retention sheath 14. In some embodiments, retention sheath 12 comprises top hook 16, double spring hooks 18, opening 20, and bubble latch 22. In some embodiments, the concealment system 10 attachment mechanism includes top hook 16 and double spring hooks 18. In some embodiments, retention sheath 12 and concealment panel 14 are joined by hinge pin 24. In some embodiments top hook 16 is stationary and double spring hooks 18 include a spring mechanism. In some embodiments, top hook 16 is configured to engage the bottom end of smart device 42 and double spring hooks 18 are configured to engage the top end of smart device 42. Top hook 16 may directly engage the bottom end of smart device 42 or indirectly engage the bottom end of smart device 42 through an intermediary connection component. Double spring hooks 18 may directly engage the top end of smart device 42 or indirectly engage the top end of smart device 42 through an intermediary connection component. In some embodiments, hinge washers 26 assist in securing hinge pin 24 joining retention sheath 12 and concealment panel 14.

In some embodiments, concealment panel 14 conceals user interaction with smart device data. In some embodiments, concealment panel 14 conceals users view, read, and/or send text messages. In some embodiments, concealment panel 14 conceals user view, read, and/or send emails. In some embodiments, concealment panel 14 conceals user view missed phone calls. In some embodiments, concealment panel 14 conceals user view, engage, or interact with one or more smart device applications. In some embodiments, concealment panel 14 conceals user view, engage, or interact one or more smart device clocks. In some embodiments, concealment panel 14 conceals user view, engage, or interact with one or more smart device calendars. In some embodiments, concealment panel 14 conceals user view, engage, or interact with one or more smart device digital personal assistants, electronic organizers, electronic notepads, any combination thereof, or the like. In some embodiments, concealment panel 14 conceals user view, engage, or interact with one or more smart device calculators. In some embodiments, concealment panel 14 conceals user view, engage, or interact with one or more smart device health monitors. In some embodiments, concealment panel 14 conceals user view, engage, or interact with one or more smart device mechanical and/or electrical components.

Figure 2:
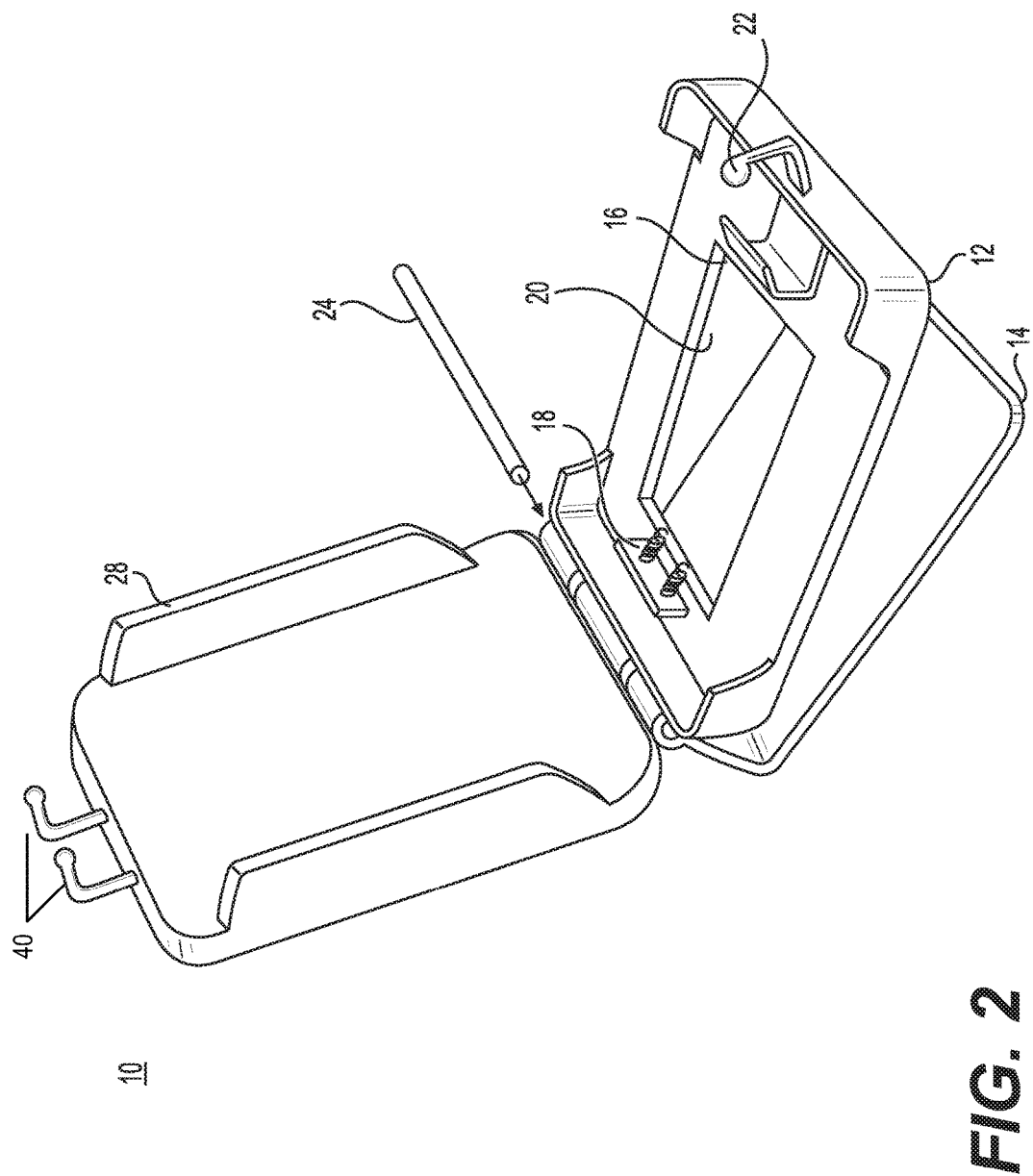
FIG. 2 depicts an embodiment of a concealment device system disclosed herein, not necessarily drawn to scale.

As shown in FIG. 2, concealment system 10 may further comprise back casing 28 joined to retention sheath 12 and concealment panel 14 by hinge pin 24. In some embodiments, back casing 28 may cover the user interface side of smart device 42. In some embodiments, back casing 28 is disposed on the opposite side of retention sheath 12 than concealment panel 14 is disposed. In some embodiments, the user interface side of smart device 42 is fully covered. In other embodiments, the user interface side of smart device 42 is partially covered. In some embodiments, back casing 28 is removable to facilitate a "lift and look" feature where users may inconspicuously view, engage, or interact with smart device data.

Figure 3:
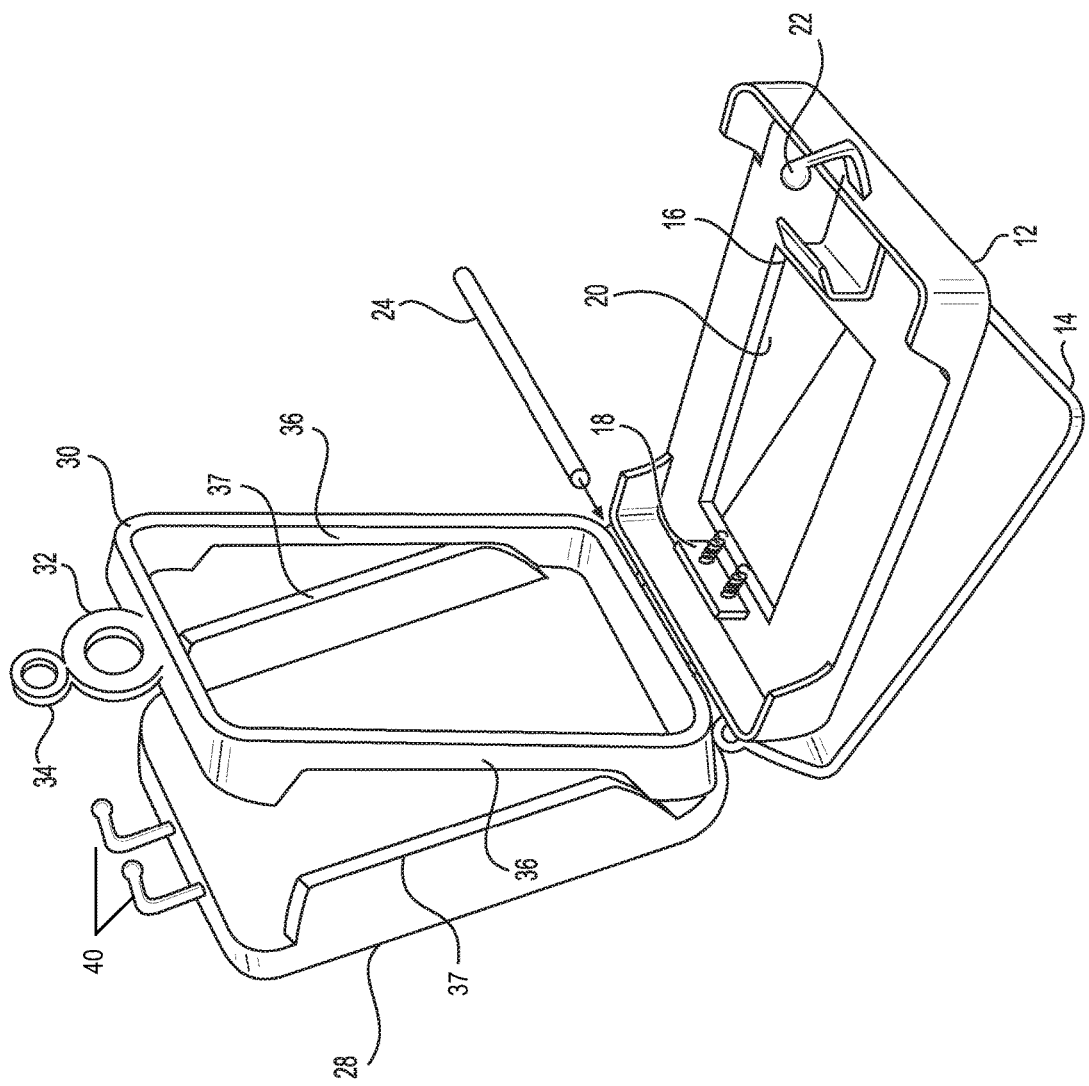
FIG. 3 depicts an embodiment of a concealment device system disclosed herein, not necessarily drawn to scale.

As shown in FIG. 3, concealment system 10 may further comprise frame 30 joined to back casing 28, retention sheath 12 and concealment panel 14 by hinge pin 24. In some embodiments, frame 30 comprises a first top loop 32 and a second top loop 34. In some embodiments, first top loop 32 and second top loop 34 are molded together. In some embodiments, first top loop 32 and second top loop 34 are linked together. In some embodiments, frame 30 is configured to surround smart device 42. Frame 30 may partially or fully surround smart device 30. In some embodiments, first top loop 32 of frame 30 is configured to join frame 30 with retention sheath 12. In some embodiments, second top loop 34 of frame 30 is configured to join frame 30 with an accessory attachment 48. In some embodiments, bubble latch 22 removably and/or lockingly engages first top loop 32. In some embodiments, retention sheath 12 tucks inside a concave contour of concealment panel 14. In some embodiments, back casing 28 comprises double latch prongs 40 and outwardly extending lips 37. In some embodiments, back casing 28 and concealment panel 14 may be joined, attached, or bound, or the like, by any suitable connection means. In some embodiments, back casing 28 and concealment panel 14 may be joined by double latch prongs 40 matingly engaging bubble latch 22.

In some embodiments, second top loop 34 houses one or more chain attachments. In some embodiments, the one or more chain attachments are necklace attachments, bracelet attachments, fob attachments, cords, straps, any combination thereof, and the like. In some embodiments, frame 30 comprises side cutouts 36 to enable access to smart device mechanical and/or electrical components. In some embodiments, the mechanical and/or electrical components include buttons, charge ports, touch-screen interface, electrical component access openings, and the like.

In some embodiments, smart device 42 may be at least partially housed within frame 30 facing forwards or backwards. In some embodiments, smart device 42 may be at least partially attached to frame 30, by any suitable attachment mechanism, facing forwards or backwards. In some embodiments, smart device 42 may be at least partially housed within back casing 28 facing forwards or backwards. In some embodiments, smart device 42 may be at least partially attached to back casing 28, by any suitable attachment mechanism, facing forwards or backwards. In some embodiments, smart device 42 may be at least partially housed within concealment panel 14 facing forwards or backwards. In some embodiments, smart device 42 may be at least partially attached to concealment panel 14, by any suitable attachment mechanism, facing forwards or backwards. In some embodiments, concealment panel 14 and retention sheath 12 are integrated as one unit for housing smart device 42. In some embodiments In some embodiments, hinge pin 24 may be removably joined, permanently joined, or a combination thereof with the retention sheath 12, concealment panel 14, frame 30, and back casing 28. In some embodiments, hinge pin 24 may be a screw pin, a magnetic pin, a snap-in pin, a friction-fitted pin, a combination thereof, or any comparable mechanism now known or later discovered. In some embodiments, hinge pin 24 joins a bottom portion of the retention sheath 12 and a bottom portion the concealment panel 14. In some embodiments, hinge pin 24 joins a side portion of the retention sheath 12 and a side portion of the concealment panel 14. In some embodiments, hinge pin 24 joins a corner portion of the retention sheath 12 and a corner portion of the concealment panel 14. In some embodiments, hinge pin 24 enables concealment panel 14 to operate as a swinging door to open and close access smart device 42. In some embodiments, concealment panel 14 swings to the left. In some embodiments, concealment panel 14 swings to the right. In some embodiments, concealment panel 14 swings downward. In some embodiments, concealment panel 14 swings upward. In some embodiments, concealment panel 14 may swing open to charge smart device 42 via opening 20 in retention sheath 12.

Figure 4:
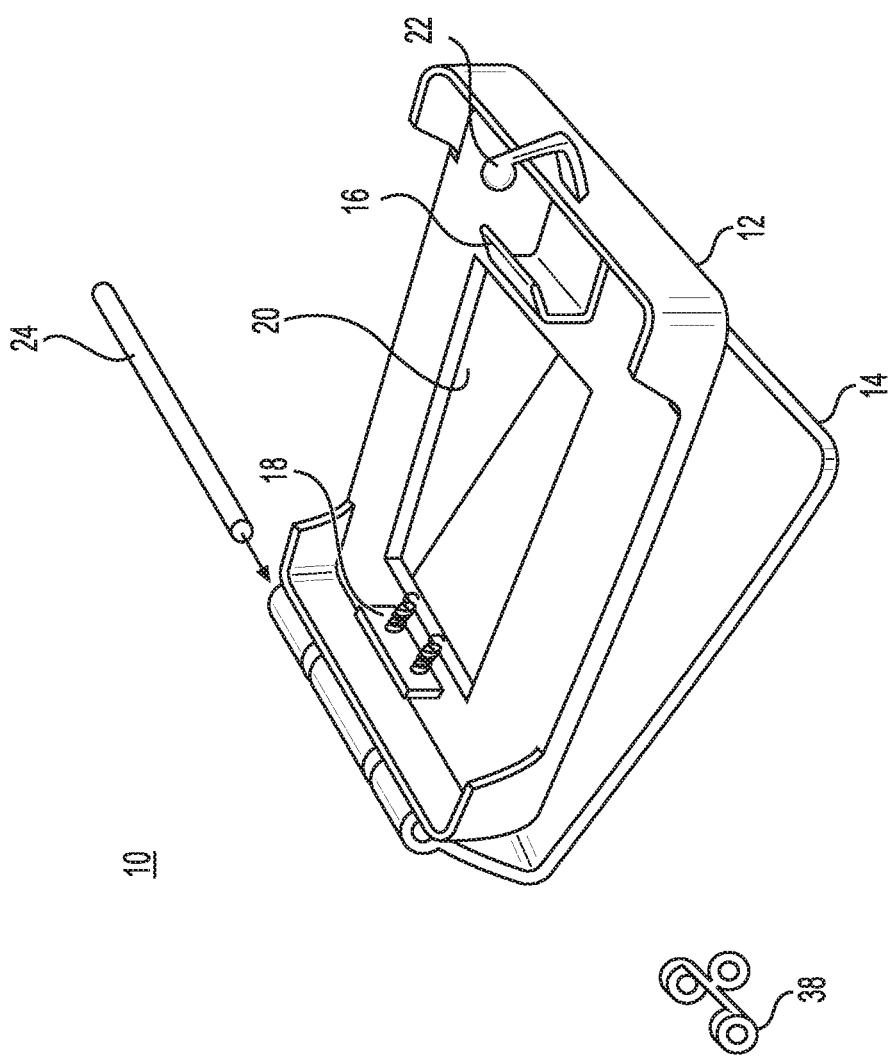
FIG. 4 depicts an embodiment of a concealment device system disclosed herein, not necessarily drawn to scale.

As shown in FIG. 4, in some embodiments, smart device concealment system 10, further comprises bracelet adapter 38, joined with retention sheath 12 and concealment panel 14 by hinge pin 24. In some embodiments, hinge pin 24 may be removably joined, permanently joined, or a combination thereof with the retention sheath 12 and concealment panel 14.

Figure 5:
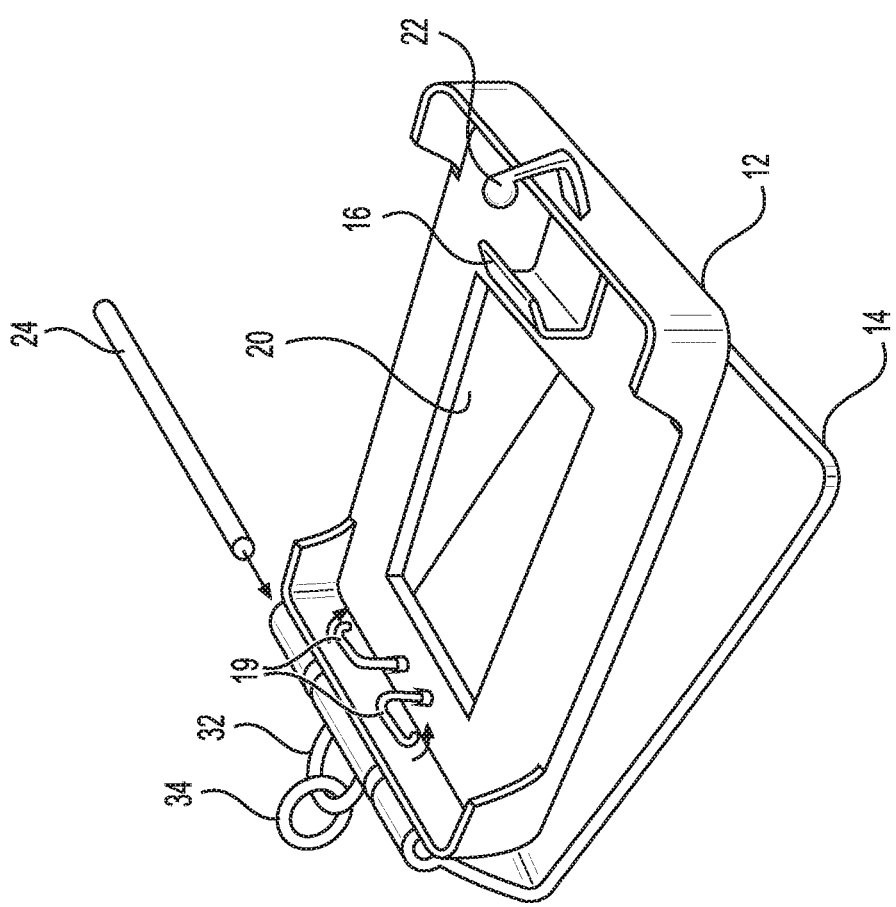
FIG. 5 depicts an embodiment of a concealment device system disclosed herein, not necessarily drawn to scale.

In some embodiments, double spring hooks 18 are molded onto and/or integral with retention sheath 12. In some embodiments, a single spring hook 18 is molded onto and/or integral with retention sheath 12. In some embodiments, three or more spring hooks are molded onto and/or integral with retention sheath 12. In some embodiments, four or more spring hooks are molded onto and/or integral with retention sheath 12. In some embodiments, five or more spring hooks are molded onto and integral with retention sheath 12. In some embodiments, double spring hooks 18 threadingly engage a molded ledge of retention sheath 12. In some embodiments, a single spring hook 18 threadingly engages a molded ledge of retention sheath 12. In some embodiments, three or more spring hooks threadingly engage a molded ledge of retention sheath 12. In some embodiments, four or more spring hooks threadingly engage a molded ledge of retention sheath 12. In some embodiments, five or more spring hooks threadingly engage a molded ledge of retention sheath 12. As shown in FIG. 5, in some embodiments, twist-and-lock hooks 19 may rotate and lock hooks 19 into rotated position. In some embodiments, twist-and-lock hooks 19 may rotate 90° or more and lock hooks 19 into rotated position. In some embodiments, twist-and-lock hooks 19 may rotate 85° or more and lock hooks 19 into rotated position. In some embodiments, twist-and-lock hooks 19 may rotate 80° or more and lock hooks 19 into rotated position. In some embodiments, twist-and-lock hooks 19 may rotate 75° or more and lock hooks 19 into rotated position. In some embodiments, twist-and-lock hooks 19 may rotate 70° or more and lock hooks 19 into rotated position. In some embodiments, twist-and-lock hooks 19 may rotate 65° or more and lock hooks 19 into rotated position. In some embodiments, twist-and-lock hooks 19 may rotate 55° or more and lock hooks 19 into rotated position. In some embodiments, twist-and-lock hooks 19 may rotate 45° or more and lock hooks 19 into rotated position. In some embodiments, the concealment system 10 attachment mechanism includes top hook 16 and twist-and-lock hooks 19. In some embodiments, top hook 16 is configured to engage the bottom end of smart device 42 and twist-and-lock hooks 19 are configured to engage the top end of smart device 42. Twist-and-lock hooks 19 may directly engage the top end of smart device 42 or indirectly engage the top end of smart device 42 through an intermediary connection component. In some embodiments, top hook 16 and double spring hooks 18 are disposed on concealment panel 14 for housing smart device 42. In some embodiments, top hook 16 and twist-and-lock hooks 19 are disposed on concealment panel 14 for housing smart device 42.

Figure 8B:
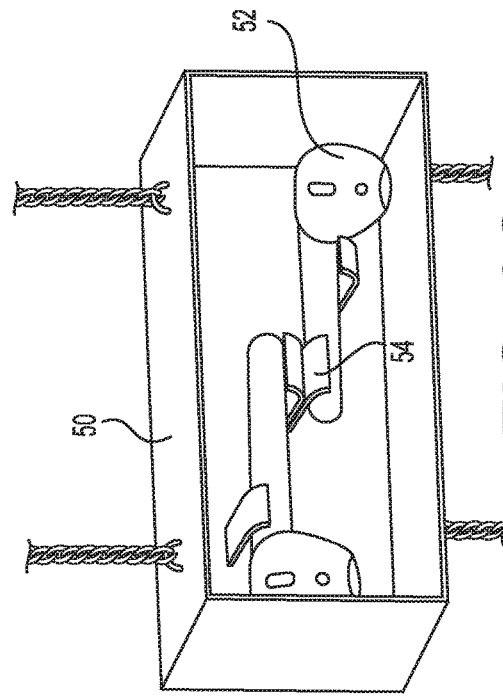
FIGS. 8A-8C depict various views of an embodiment of a concealment device system with a functional insert attached thereto.
Figure 8C:
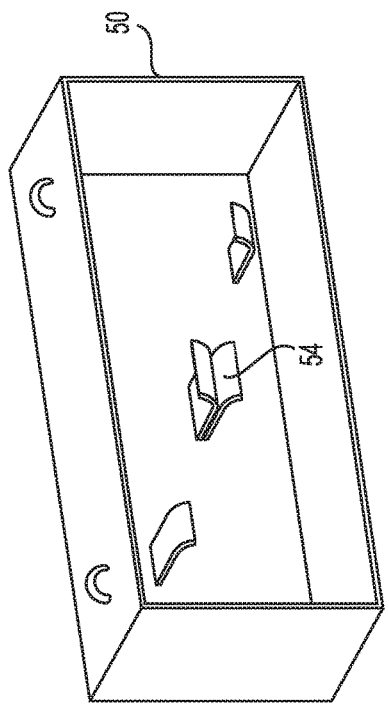
Figure 8A:
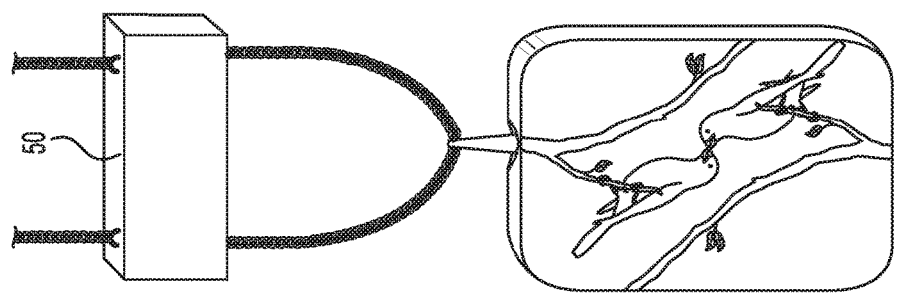

As shown in FIGS. 8A-8C, in some embodiments, concealment system 10 further comprises one or more functional inserts 50 for housing personal items. The one or more functional inserts may be a pill receptacle, a currency receptacle, a key receptacle, a fold-out photo album, photo frame, earphones receptacle, watch receptacle, any combination thereof, or the like. In some embodiments, one or more functional inserts is removably attached to the accessory attachment. In some embodiments, one or more functional inserts is removably attached to necklace 48. In some embodiments, one or more functional inserts is removably housed inside back casing 28, frame 30, or combinations thereof. In some embodiments, functional insert 50 comprises prongs 54 for housing earphones 52. In some embodiments, earphones 52 are AIRPODS®.

In some embodiments, concealment panel 14 may include a front face 15 and a back face. In some embodiments, the back face will engage frame 30, retention sheath 12, and/or back casing 28. In some embodiments, front face 15 may be decorative. In some embodiments, the front face may include surface ornamentation. In some embodiments, the surface ornamentation may include set stones, enameling, textured and etched designs, fused metal embellishments, and the like. In some embodiments, concealment panel 14 may be removably attachable such that one decorative concealment panel may be interchanged for a different decorative concealment panel. In some embodiments, concealment panel 14 may comprise most generally all metals and alloys thereof now known or later developed or discovered, including, but not limited to copper, stainless steel, platinum, silver, gold, gold plated, pewter, aluminum, tungsten, titanium, and/or any combination thereof. In some embodiments, the concealment panel may comprise polymers including, but not limited to plastic and rubber, ceramic, wood, glass, any material now known or later discovered or developed used to make jewelry and related accessories, and/or any combination thereof.

In some embodiments, concealment system 10 may be any height and/or any width suitable to accommodate smart device 42. In some embodiments, concealment system 10 may be any height and/or any width suitable to at least partially house smart device 42. In some embodiments, concealment system 10 may have a height of from 25 mm to 60 mm. In some embodiments, concealment system 10 may have a height of from 30 mm to 55 mm. In some embodiments, concealment system 10 may have a height of from 35 mm to 50 mm. In some embodiments, concealment system 10 may have a height of from 35 mm to 45 mm. In some embodiments, concealment system 10 may have a height of from 35 mm to 40 mm. In some embodiments, concealment system 10 may have a height of from 40 mm to 50 mm. In some embodiments, concealment system 10 may have a height of from 45 mm to 50 mm. In some embodiments, concealment system 10 may have a width, of from 20 mm to 50 mm. In some embodiments, concealment system 10 may have a width, of from 30 mm to 40 mm. In some embodiments, concealment system 10 may have a width, of from 30 mm to 38 mm. In some embodiments, concealment system 10 may have a width, of from 30 mm to 36 mm. In some embodiments, concealment system 10 may have a width, of from 30 mm to 34 mm. In some embodiments, concealment system 10 may have a width, of from 30 mm to 32 mm. In some embodiments, concealment system 10 may have a width, of from 32 mm to 40 mm. In some embodiments, concealment system 10 may have a width, of from 34 mm to 40 mm. In some embodiments, concealment system 10 may have a width, of from 36 mm to 40 mm. In some embodiments, concealment system 10 may have a width, of from 38 mm to 40 mm.

The frame 30 may be made from any suitable material, including but not limited to polymer material, aluminum, wood, ceramic, stainless steel, and combinations thereof. Frame 30 may be any suitable shape to engage smart device 42. In some embodiments frame 30 is generally rectangular. In some embodiments, frame 30 is formed with cutouts 36. Similarly, retention sheath 12 may be made from any suitable material, including but not limited to polymer material, aluminum, wood, ceramic, stainless steel, and combinations thereof. Retention sheath 12 may be any suitable shape to engage smart device 42. In some embodiments, retention sheath 12 is generally rectangular. In some embodiments, retention sheath 12 is generally recessed. In some embodiments, retention sheath 12 is sufficiently recessed to receive and hold smart device 42. In some embodiments, retention sheath 12 is generally flat. In some embodiments, retention sheath 12 is sufficiently flattened to receive and hold smart device 42. Still similarly, back casing 28 may be made from any suitable material now known or later discovered, including but not limited to polymer material, aluminum, wood, ceramic, stainless steel, and/or any combinations thereof. Back casing 48 may be any suitable shape to engage smart device 42. In some embodiments, back casing 28 may be any suitable shape to cover smart device 42. In some embodiments back casing 28 is generally rectangular. In some embodiments, back casing 28 is generally recessed, and contoured so as to engage at least the frame 30, as shown. In some embodiments, cutouts 36 of frame 30 are configured to engage at lips 37 of back casing 28.

In some embodiments, frame 30 may provide smart device protection against damage from scratches, cracks, glass fractures, and the like. Specifically, frame may further comprise bumpers, pads, a combination thereof, and the like configured to protect smart device 42 from the above-mentioned types of damage.

Figure 6:
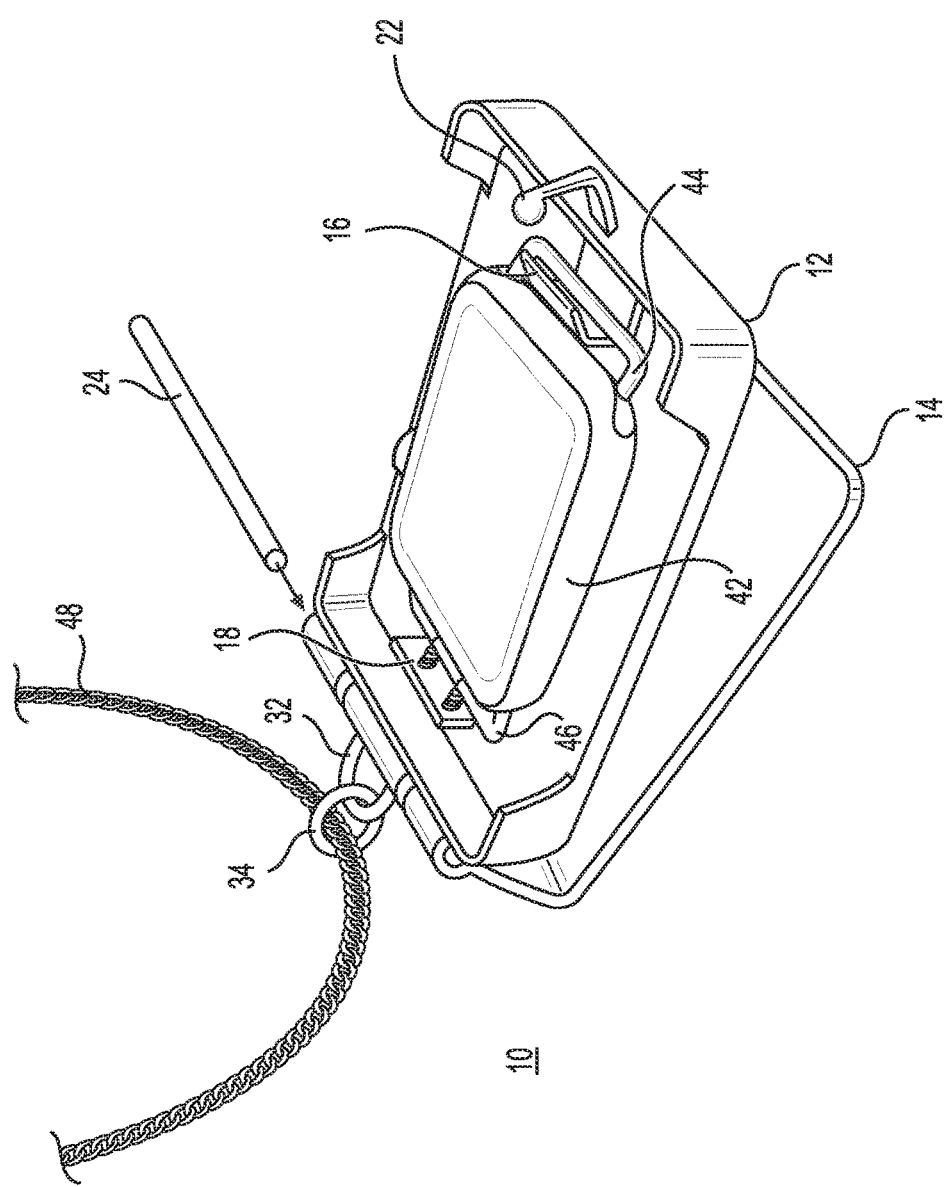
FIG. 6 depicts an embodiment of a concealment device system with a smart device loaded therein.
Figure 7:
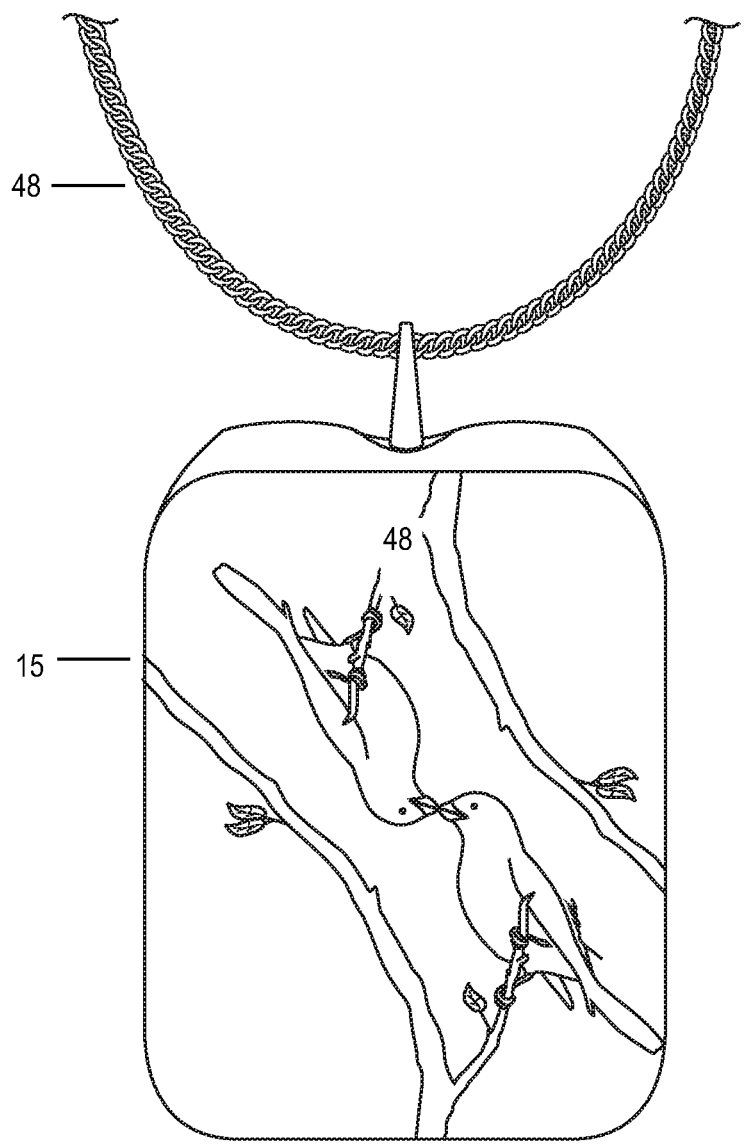
FIG. 7 depicts a front view of a concealment device system.

FIG. 6 depicts a preferred embodiment, wherein smart device concealment system 10 houses a smart device 42. In some embodiments, the smart device is an APPLE WATCH®. In some embodiments, smart device 42 includes at least one intermediary connection component to join smart device 42 with an accessory, such as but not limited to concealment mechanism 10. In some embodiments, the at least one intermediary connection component may comprise at least one accessory receiving component configured to join smart device 42 with an accessory, such as but not limited to concealment mechanism 10. In some embodiments, the at least one accessory receiving component is an accessory receiving pin. In some embodiment, smart device 42 includes a first accessory receiving pin 44 on a top end and a second accessory receiving pin 46 on a bottom end. The receiving pins 44, 46 will either be pre-loaded in smart device 42 as part of smart device manufacturer's design or a compatible accessory pin may be purchased and pre-attached to the smart device for use with the disclosed concealment system. In some embodiments, the accessory attachment is necklace 48 and is loaded into second top loop 34. In some embodiments, smart device 42 may comprise any suitable accessory receiving component now known or later developed.

The receiving pins 44, 46 of smart device 42 may engage with retention sheath 12 in one of at least two ways. In a preferred method of using concealment system 10, and as further shown in FIG. 6, pin 46 is top hook 16 is installed facing one direction and double spring hooks 18 are installed facing an opposite direction. First, second receiving pin 46 is inserted into double spring hooks 18. Then, receiving pin 44 is loaded onto top hook 16. In another method of using concealment system 10, top hook 16 is installed facing one direction and twist-and-lock hooks 19 are installed in an opposite direction. First, receiving pin 44 is loaded onto top hook 16. The second receiving pin is then loaded onto twist-and-lock hooks 19 and hooks 19 are rotated approximately 90°, locking the hooks in the rotated position.

Figure 9:
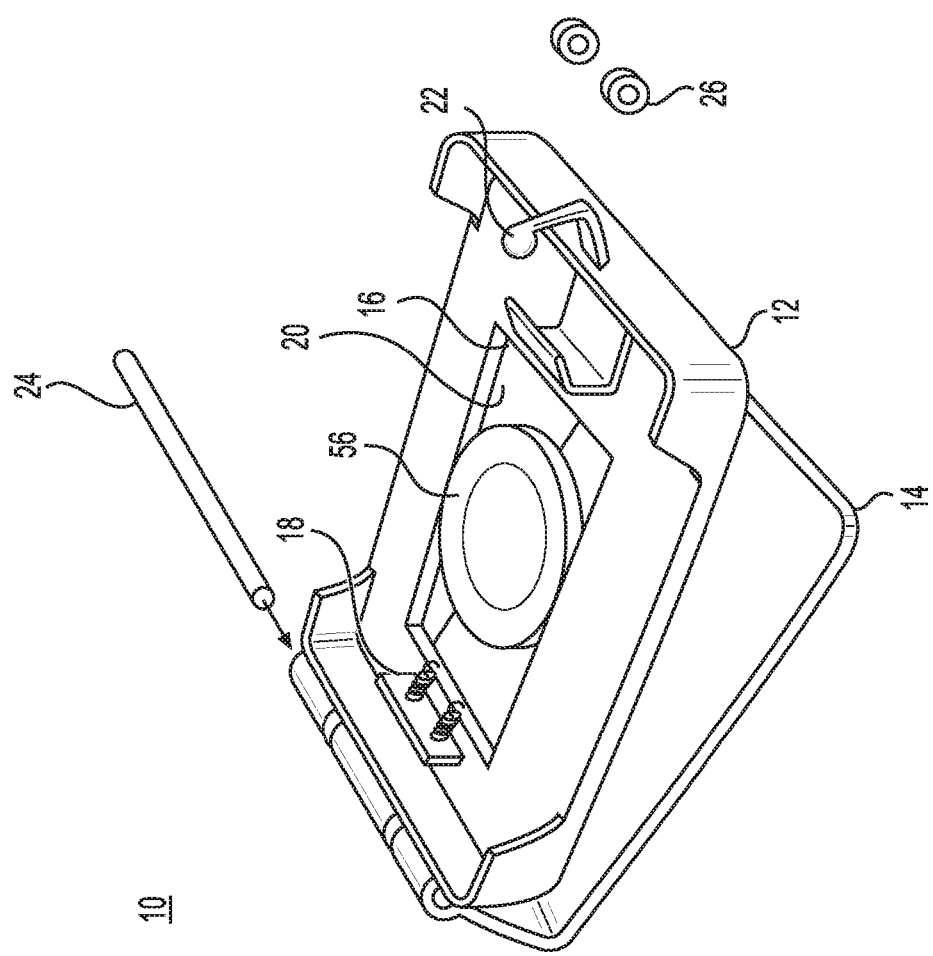
FIG. 9 depicts an embodiment of a concealment device system with a charging module loaded therein.

As shown in FIG. 9, in some embodiments, smart device concealment system 10 further comprises a charger module 56 for recharging a battery of the smart device. In some embodiments, charging module 56 comprises a rechargeable battery powered by Lithium Polymer, Lithium Ion, or the like. In some embodiments, charging module 56 may operate as a motion charger where battery charging is activated by an actuating motion of charging module 56, concealment system 10, or combinations thereof. In some embodiments, charging module 56 comprises a switch (not shown) that upon actuation moves from a first position to a second position, and consequently activates charging module 56. Charging module 56 may be disposed on back casing 28, frame 30 or concealment panel 14 by any suitable attachment means now known or later discovered.

What is claimed is:

1. A smart device concealment system, comprising:
    a retention sheath configured to receive and retain a smart device having a back side, user interface side, a top end, and a bottom end;
    a concealment panel including a front face and back face, the concealment panel joined to the retention sheath and configured to conceal at least a back side of the smart device; and
    an attachment mechanism configured to engage the smart device and secure the smart device onto the retention sheath or onto the concealment panel,
    wherein the front face of the concealment panel includes surface ornamentation and the back face of the concealment panel is configured to be positioned adjacent the back side of the smart device, and
    wherein the retention sheath and the concealment panel are configured to permit a user to engage the user interface side of the smart device while the smart device is concealed.

2. The smart device concealment system of claim 1, wherein the attachment mechanism includes a top hook configured to engage the top end of the smart device and double spring hooks configured to engage the bottom end of the smart device.

3. The smart device concealment system of claim 1, wherein the attachment mechanism includes a top hook configured to engage the top end of the smart device and twist-and-lock hooks configured to engage the bottom end of the smart device.

4. The smart device concealment system of claim 1, wherein the retention sheath is generally flat and generally rectangular.

5. The smart device concealment system of claim 1, wherein the retention sheath is generally recessed and generally rectangular.

6. The smart device concealment system of claim 1, further comprising a frame configured to surround the smart device and formed with a first loop and second loop, wherein the first loop is configured to join the frame with the retention sheath, and wherein the second loop is configured to join the smart device with an accessory attachment.

7. The smart device concealment system of claim 6, wherein the frame is generally rectangular.

8. The smart device concealment system of claim 6, wherein the accessory attachment is a necklace.

9. The smart device concealment system of claim 1, further comprising a bracelet adapter for attaching a bracelet.

10. The smart device concealment system of claim 1, further comprising a back casing for covering the user interface side of the smart device.

11. The smart device concealment system of claim 1, wherein the height of the system is from 35 mm to 50 mm.

12. The smart device concealment system of claim 1, wherein the width of the system is from 30 mm to 40 mm.

13. A smart device concealment system, comprising:
- a retention sheath configured to receive and retain a smart device having a back side, user interface side, a top end, and a bottom end;
- a concealment panel joined to the retention sheath and configured to conceal at least a back side of the smart device; and
- an attachment mechanism for securing the smart device onto the retention sheath, wherein the attachment mechanism includes a top hook configured to engage the top end of the smart device and double spring hooks configured to engage the bottom end of the smart device.

14. The smart device concealment system of claim 13, wherein the retention sheath and the concealment panel are joined by a hinge pin.

15. The smart device concealment system of claim 13, wherein the concealment panel may comprise copper, stainless steel, platinum, silver, gold, any combination thereof.

16. The smart device concealment system of claim 13, further comprising one or more functional inserts.

17. The smart device concealment system of claim 16, wherein the one or more functional inserts include a pill receptacle, a currency receptacle, a key receptacle, a fold-out photo album, a photo frame, a watch receptacle, an earphones receptacle, or any combination thereof.

18. The smart device concealment system of claim 13, wherein the concealment panel opens to permit charging of the smart device.

19. The smart device concealment system of claim 13, further comprising a charger module for recharging a battery of the smart device.

20. The smart device concealment system of claim 19, wherein the charger module is triggered by an actuating motion of the concealment system.

21. A smart device concealment system, comprising:
- a retention sheath configured to receive and retain a smart device having a back side, user interface side, a top end, and a bottom end; and
- a concealment panel including a front face and back face, the concealment panel joined to the retention sheath and configured to conceal at least a back side of the smart device,
- wherein the front face of the concealment panel includes surface ornamentation and the back face of the concealment panel is configured to be positioned adjacent the back side of the smart device, and
- wherein the retention sheath and the concealment panel are configured to permit a user to engage the user interface side of the smart device while the smart device is concealed.

* * * * *